(12) United States Patent
Zhang et al.

(10) Patent No.: US 9,973,426 B2
(45) Date of Patent: *May 15, 2018

(54) SYSTEM AND METHOD FOR SCALING IPV6 ON A THREE-TIER NETWORK ARCHITECTURE AT A LARGE DATA CENTER

(71) Applicant: Cisco Technology, Inc., San Jose, CA (US)

(72) Inventors: Ming Zhang, San Jose, CA (US); Chengelpet Ramesh, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 14/794,174

(22) Filed: Jul. 8, 2015

(65) Prior Publication Data

US 2015/0312148 A1    Oct. 29, 2015

Related U.S. Application Data

(63) Continuation of application No. 13/555,354, filed on Jul. 23, 2012, now Pat. No. 9,100,216.

(51) Int. Cl.
| | |
|---|---|
| *H04L 12/741* | (2013.01) |
| *H04L 12/46* | (2006.01) |
| *H04L 12/937* | (2013.01) |

(52) U.S. Cl.
CPC .......... *H04L 45/74* (2013.01); *H04L 12/4641* (2013.01); *H04L 12/4654* (2013.01); *H04L 49/253* (2013.01)

(58) Field of Classification Search
CPC ............ H04Q 11/0478; H04L 12/4645; H04L 12/467; H04L 12/4675; H04L 49/351
See application file for complete search history.

(56) References Cited

U.S. PATENT DOCUMENTS

| | | | |
|---|---|---|---|
| 8,054,840 B2 | 11/2011 | Booth et al. | |
| 8,358,597 B2 * | 1/2013 | Fung | H04L 45/04 370/256 |

(Continued)

FOREIGN PATENT DOCUMENTS

WO    2012002850 A1    1/2012

OTHER PUBLICATIONS

Notification of Transmittal of the International Search Report and the Written Opinion of the International Search Authority, of the Declaration from corresponding International Application No. PCT/US2013/051462, dated Jan. 13, 2014, 18 pages.

*Primary Examiner* — Chandrahas B Patel
(74) *Attorney, Agent, or Firm* — Parker Ibrahim & Berg LLP; James M. Behmke; Stephen D. LeBarron (57) ABSTRACT

Some implementations provide a method for managing switches in a data center that includes: (1) establishing a connection from one switch to another switch in the data center, the data center providing a plurality of virtual local area networks (VLANs), each VLAN including at least one Virtual Machine and capable of spanning across more than one of the plurality of switches; (2) provisioning device prefixes for IPv6 addresses, a given device prefix corresponding to a particular VLAN on a particular switch in the data center, the given device prefix included in a host address of a particular virtual machine, the particular virtual machine hosted on a server computer, the sever computer connected to the particular switch without additional intervening switches; (3) configuring a hardware memory to include prefix information and address information; and (4) transferring packets by using the prefix information and the address information.

14 Claims, 5 Drawing Sheets

(56) References Cited

U.S. PATENT DOCUMENTS

| | | |
|---|---|---|
| 8,498,297 B2 | 7/2013 | Bragg et al. |
| 8,687,636 B1 | 4/2014 | Sivan et al. |
| 8,694,675 B2 | 4/2014 | Wang et al. |
| 8,711,869 B2 | 4/2014 | Ishihara et al. |
| 8,750,309 B2 | 6/2014 | Ernstrom |
| 2009/0041023 A1 | 2/2009 | Ould Brahim et al. |
| 2010/0306415 A1 | 12/2010 | Sultan et al. |
| 2011/0069711 A1 | 3/2011 | Jha et al. |

* cited by examiner

SYSTEM AND METHOD FOR SCALING IPV6 ON A THREE-TIER NETWORK ARCHITECTURE AT A LARGE DATA CENTER

CROSS-REFERENCE TO RELATED APPLICATIONS

This application is a Continuation application of U.S. patent application Ser. No. 13/555,354, filed Jul. 23, 2012, the entire content of which is herein incorporated by reference.

TECHNICAL FIELD

The following disclosure relates generally to a managed network in a data center.

BACKGROUND

As Virtual Machines (VMs) are widely implemented in data centers, the number of VMs connected by a managed network at a data center grows dramatically. The number could be hundreds of thousands or even millions. This dramatic increase in number of VMs on the managed network creates significant challenges to network equipment providers to support these VMs, both in data plane and control plane of the managed network at a data center.

DESCRIPTION OF EXAMPLE EMBODIMENTS

Overview

Some implementations provide a method for managing switches in a data center. The method includes: (1) establishing, at a switch in the data center, a connection with at least one other switch in the data center, the data center including switches and server computers, the data center employing a multi-tiered architecture that includes a first tier, a second tier on top of the first tier, and a third tier on top of the second tier, the data center providing a plurality of virtual local area networks (VLANs), each VLAN comprising at least one Virtual Machine and capable of spanning across more than one of the plurality of switches; (2) setting up, at the switch, a routing table, the routing table including Internet Protocol version 6 (IPv6) entries; (3) provisioning device prefixes for the IPv6 entries in the routing table of the switch, a given device prefix corresponding to a particular VLAN on a particular switch in the data center, the given device prefix included in a host address of a particular virtual machine, the particular virtual machine hosted on a server computer, the sever computer connected to the particular switch without additional intervening switches; and (4) transferring packets between the switches and the server computers by using the routing table.

DETAILED DESCRIPTION

The implementations described herein relate to deployment internet protocol (IPv6) at data centers having large numbers of virtual machines (VMs). Such deployment utilizes merchant hardware or entails minor upgrade to such hardware. Some implementations are configured to handle millions of VMs based on switches with limited hardware and software in the managed network of the data center. Other implementations disclosed herein are configured to mitigate potentially inundating amounts of Neighbor-Discovery Neighbor Advertisements packets generated by the VMs in date centers.

A data center may employ a three-tier network architecture. The three tiers include access switches at tier 1 (the first tier), aggregation switches at tier 2 (the second tier), and core switches at tier 3 (the third tier). Tier 2 is on top of tier 1 and tier 3 is on top of tier 2.

Figure 1:
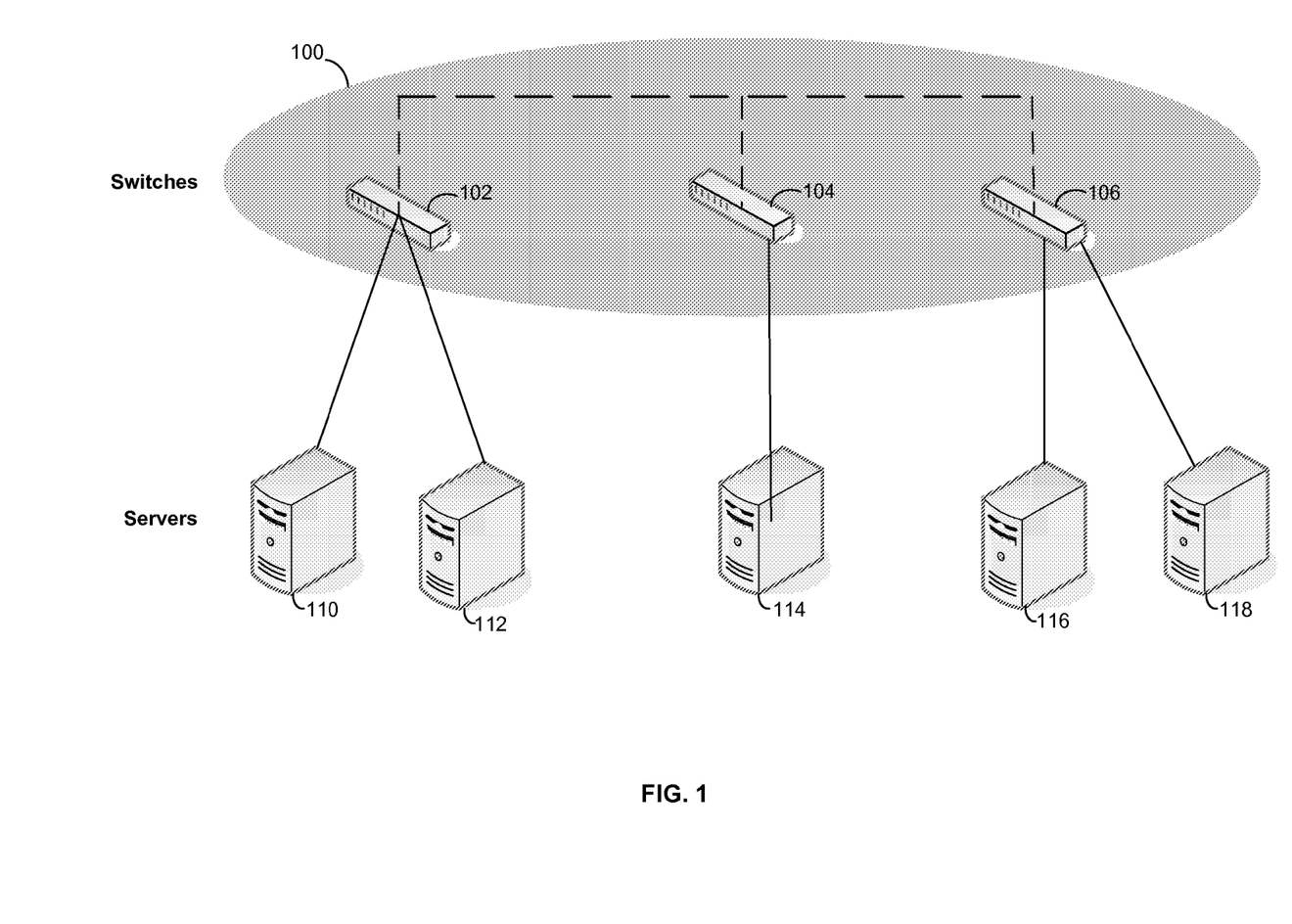
FIG. 1 illustrates a data center with a managed network that includes multiple switches.

FIG. 1 shows a data center having a cluster of switches 100. The switches are based on the three-tier network architecture as discussed above. As shown in FIG. 1, the cluster 100 has switches 102, 104, and 106 dedicated to moving packets around the managed network. Switches 102, 104, and 106 correspond to access switches. Underlying aggregation switches and core switches are not shown. Server computers 110 and 112 are on switch 102. Packets transmitted by server computers 110 and 112 are forwarded by switch 102 to the managed network of the data center. Packets destined to server computers 110 or 112 are finally forwarded by switch 102 to server computers 110 or 112, respectively. Server computer 114 is on switch 104. Packet exchanges between server computer 114 and switch 104 are similar to those between server computers 110 and 112 and switch 102. Server computers 116 and 118 are on switch 106. Packet exchanges between server computers 116 and 118 and switch 104 are similar to those between server computers 110 and 112 and switch 102.

By way of an example, packets transmitted by server computer 110 and destined for server computer 116 may arrive at switch 102. Switch 102 may inspect the packets for the destination address. Then switch 102 may consult a hardware memory on switch 102 to ascertain where to forward to packet. Switch 102 may then forward packets transmitted by server computer 110 and destined for server computer 116 to switch 104. The path may be through additional intervening switches, for example, aggregation switches at tier 2 and core switches at tier 3, as discussed above. Switch 104 may inspect the packets for destination address and then direct the packets to server computer 116.

Likewise, packets transmitted by server computer 116 and destined for server computer 110 may arrive at switch 104. Switch 104 may inspect the packets for the destination address. Then switch 104 may consult a hardware memory on switch 104 to ascertain where to forward to packet. Switch 104 may then forward packets transmitted by server computer 116 and destined for server computer 110 to switch 102. The path may be through additional intervening switches, for example, aggregation switches at tier 2 and core switches at tier 3, as discussed above. Switch 104 may inspect the packets for destination address and then direct the packets to server computer 110.

Large numbers of virtual machines (VMs) may be configured on the server computers. For example, in cloud computing or e-commerce applications, the server computers may host millions of VMs. In other examples, multiple millions of VMs may be configured on the server computers. These illustrative numbers pose a challenge in routing packets for these VMs on the managed network of data centers. Deployment of IPv6 at the data center may, in theory, assist addressing the routing needs. At 128 bits, the address space of IPv6 has increased dramatically compared to that of IPv4 at 32 bits. However, each IPv6 address takes up four times for storage space. Switches in a data center are generally computing devices with merchant hardware components. Merchant hardware means hardware that is commercially available. For example, merchant hardware may be offered by manufacturers as stock items. In generally, merchant hardware may not include custom-made items specifically tailored to, for example, a single product or a single customer. These merchant hardware components may have limited storage capacity that imposes a cap on the amount of prefixes and addresses information stored thereon. Using dedicated or custom hardware to accommodate the increased storage may not be economically feasible because such dedicated customization entails substantial up-front investment in chip fabrication. Thus, integrating IPv6 addresses with economically feasible network switches remains a challenge.

Figure 2:
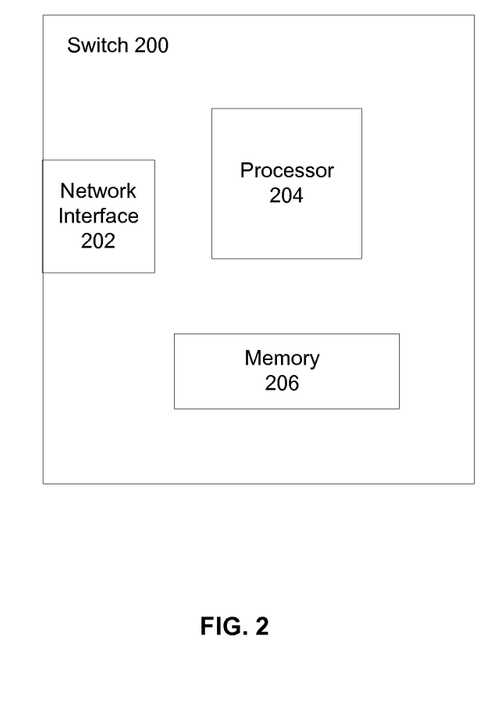
FIG. 2 illustrates a switch configuration according to some implementations.

FIG. 2 shows a switch 200 including a network interface 202, a processor 204, and hardware memory 206. In the depicted configuration, network interface 202 receives packets from the managed network and transmits packets onto the managed network, for example, based on the respective destination addresses of the packets. In some implementations, processor 204 may decide the next hop on the managed network to deliver the packets received. For example, the processor 204 may make the decision according to information stored in a table in the hardware memory 206. The table may be, for example, a routing table or a IPv 6 neighbor table. The routing table may include one column of the prefix address field, and another column of the next hop address field. The routing table may be searched by querying the prefix address field. The IPv6 neighbor table may include, for example, a column of IPv6 address, a column of Media Access Control (MAC) address, and a column of port number. The IPv6 neighbor table may be searched by querying the IPv6 address. In other implementations, the hardware memory may be a hardware table such as, for example, a Content Accessible Memory (CAM) Forwarding Information Base (FIB) table. The switch 200 may receive an incoming packet on one port and then use the information stored in the CAM FIB table to forward the incoming packet to another switch through a particular port on switch 200 according to, for example, the MAC address of the next hop for the destination address of the incoming packet. The CAM may include a binary CAM that search only for ones and zeros. The CAM may include Ternary CAM that also searches a third state, "X." The X state may be a "mask," meaning its value can be anything. The mask may be used as a netmask in calculating a subnet address. Switches may store their entire FIB table in these TCAMs, allowing for very quick lookups without processor involvement.

In the data plane, the challenge of implementing IPv6 includes hardware limitations of access and distribution switches. For example, access switches are top-of-rack (ToR) switches for bridging and routing packets. The forwarding table (CAM FIB table) sizes are limited by the underlying hardware on the corresponding access switches. Access switches may have 16 thousands to 64 thousands CAM FIB table entries to store forwarding addresses. This range is significantly smaller than the number of VMs at these data centers. In theory, ASIC devices specially designed for these routing functions can obviate these hardware limitations. However, the associated increase in cost and complexity of manufacturing these special purpose ASICs are hard to justify because the quantity of switches at data centers may not be sufficiently large for volume amortization to take effect. In addition, the table size provided by these ASIC devices need to be determined during the design phase, which can predate the actual deployment by years. Because the demand at the data center networks is evolving rapidly, predictions tend to fail. As a result, switch hardware limitations impose a challenge in the data plane when deploying IPv6 at data centers in which large numbers of VMs are configured.

In the control plane, however, a challenge of implementing IPv6 may include the task of handling the dramatically increased management packets. With VM implementation based on IPv6, to inform other VMs on the managed network of the data center about the state of a VM, the VM may send Neighbor Discovery Neighbor Advertisement (ND-NA) packets periodically to all other VMs. These broadcast ND-NA packets are similar to periodic gratuitous Address Resolution Protocol (ARP) packets generated by VMs implementations using IPv4. When millions of VMs on the managed network send ND-NA packets, the quantity of ND packets in the data center may be difficult to process. Because the aggregation switches process these ND packets using their processors (e.g., processor 204 of FIG. 2), the processing overhead at the aggregation switches increases rapidly. If the aggregation switches are inundated by the ND packets, the processors of these aggregation switches may have insufficient capacity to handle other tasks. As a result, neighbor and route flapping can occur. Therefore, the dramatic increase of management packets can cause issues in control plane of the managed network of data centers implementing VMs based on IPv6.

Figure 3:
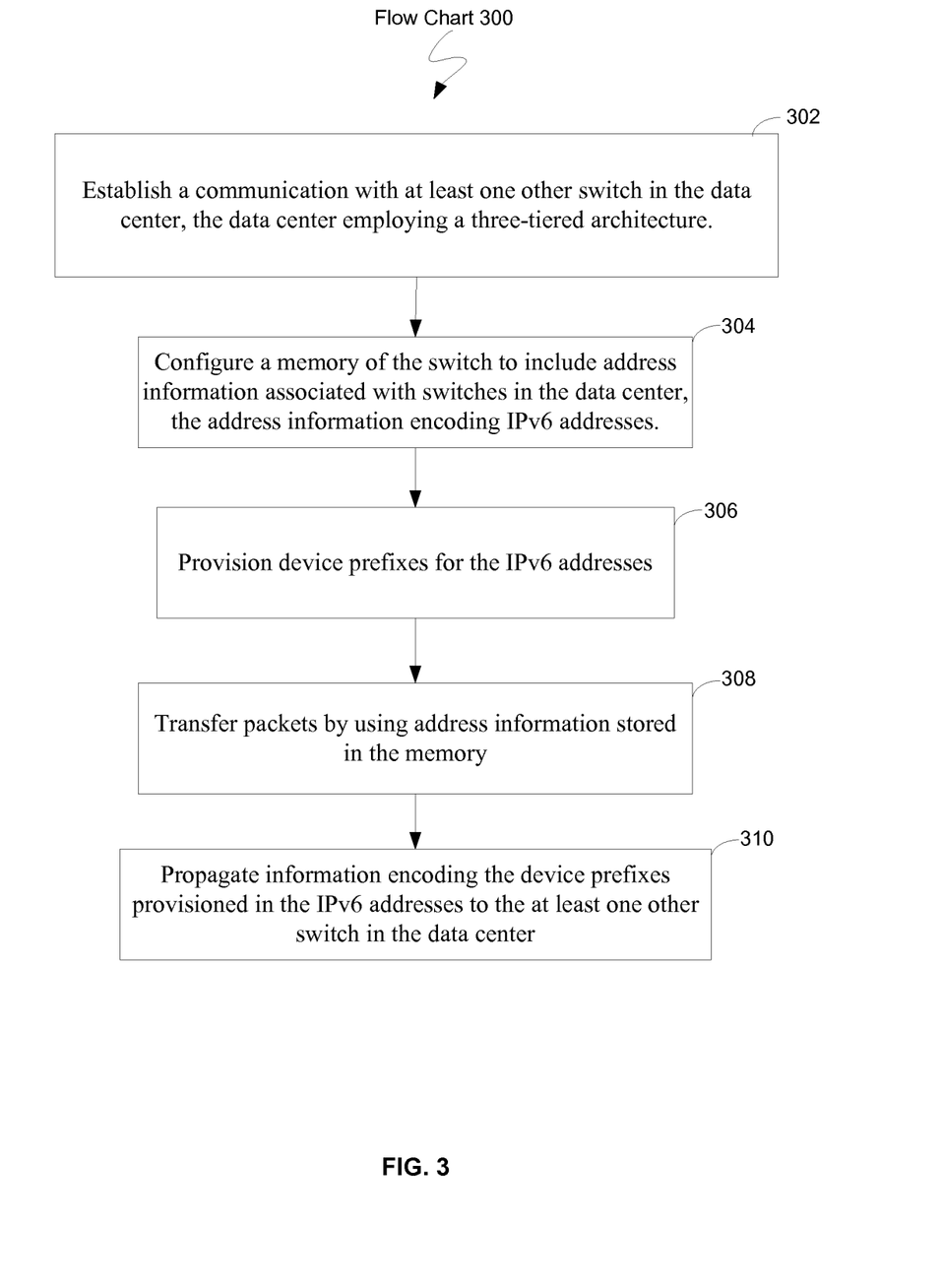
FIG. 3 illustrates a flow chart for scaling IPv6 on a three-tier network architecture at a large data center according to some implementations.

FIG. 3 illustrates a flow chart 300 for scaling IPv6 on a three-tier network architecture at a large data center according to some implementations. In block 302, a switch in the data center establishes a connection with at least one other switch in the data center. An example switch has been discussed in association with FIG. 2. The data center includes multiple switches configured to transfer packets for server computers associated with the data center. The data center employs a three-tiered architecture that includes a first tier, a second tier on top of the first tier, and a third tier on top of the second tier. Tier 3 corresponds to core switches. Tier 3 may provide transportation of data across a network. The purpose of tier 3 is to reduce the latency time in the delivery of packets. Tier 2 corresponds to aggregation switches. Tier 2 may provide routing service and also may provide policy-based network connectivity. For example, aggregation switches may perform packet filtering of packets based on its source and destination information to create network borders. Aggregation switches also may perform quality of service (QoS) such that access switches can read packets and prioritize delivery based on user-defined policies. Aggregation switches additionally may perform aggregation for the access switches. Aggregation switches further may perform control broadcast and multicast. Tier 1 corresponds to access switches connected to end-user computer servers. Access switches may allow workgroups and users to use the services provided by the aggregate switches and core switches. A connection between two access switches in the data centers means there is a path for transferring packets between the two access switches. The path can traverse aggregation switches in tier 2 and core switches in tier 3.

The data center provides several virtual local area networks (VLANs). Each VLAN includes at least one virtual machine (VM). Each VLAN is capable of spanning across more than one of the switches in the data center. Each VM is associated with a physical computer server. Each physical computer server can host multiple VMs thereon.

In block 304, the switch at the data center configures its hardware memory, for example, hardware memory 206 as shown in FIG. 2, to include prefix information identifying switches at the data center and address information associated with respective switches and VMs in the data center. For example, pairs of prefix information and the address information may be stored in a routing table. For a given pair of prefix and address, the prefix field may identify the destination switch for transporting a packet to its destination address and the address information may provide the hardware address of the next hop switch for forwarding the packet.

In block 306, the switch at the data center provisions device prefix for the IPv6 addresses in the hardware memory. The specifics of the device prefixes will be discussed in more detail below in association with FIG. 4. Here, the device prefix corresponds to a given VLAN on a particular switch (for example, switch 102) in the data center. The device prefix is included in the host address of a given VM belonging to the VLAN. In some implementations, the given VM is hosted on a physical server computer in the data center. The physical server computer is connected to the particular switch (for example, switch 102) in the data center without additional intervening switches.

In block 308, the switch at the data center uses the prefix information and address information encoded in the hardware memory to assist transferring packets received at the switch. In some implementations, the hardware memory includes a FIB CAM table. For example, an incoming packet arriving at switch 200 has a destination address corresponding to a VM in the data center. The destination address includes a device prefix. The switch can use the FIB CAM table to forward the incoming packet received at one port to another port according to the destination address of the incoming packet. The switch can perform a table look-up in hardware memory 206 by using the destination address in the incoming packet. The table look-up may include searching FIB CAM table to match the device prefix of the destination address in the incoming packet to a prefix field in the routing table. The table look-up may yield, for example, the next hop switch to forward the packet en-route toward its destination address. In some implementations, the table look-up may yield the media access (MAC) address of the next hop switch to which the packet should be forwarded.

In block 310, the switch at the data center propagates information encoding the device prefixes provisioned in the routing table to the at least one other switch in the data center. The propagation is over the connection established in block 302. In some implementations, the information is propagated according to an Interior Gateway Protocol (IGP). Examples of IGP include, but are not limited to Routing Information Protocol next generation (RIPng), Open Shortest Path First version 3 (OSPFv3), and Intermediate System-to-Intermediate System (ISIS) for IPv6. In some implementations, the information is propagated to the aggregation switches in the second tier or even core switches in the third tier of the multi-tiered architecture. For example, the information is propagated through aggregation switches on the second tier and then core switches on the third tier. On a switch that receives the device prefix information in its routing table, the device prefix may be installed in its FIB CAM table.

Figure 4:
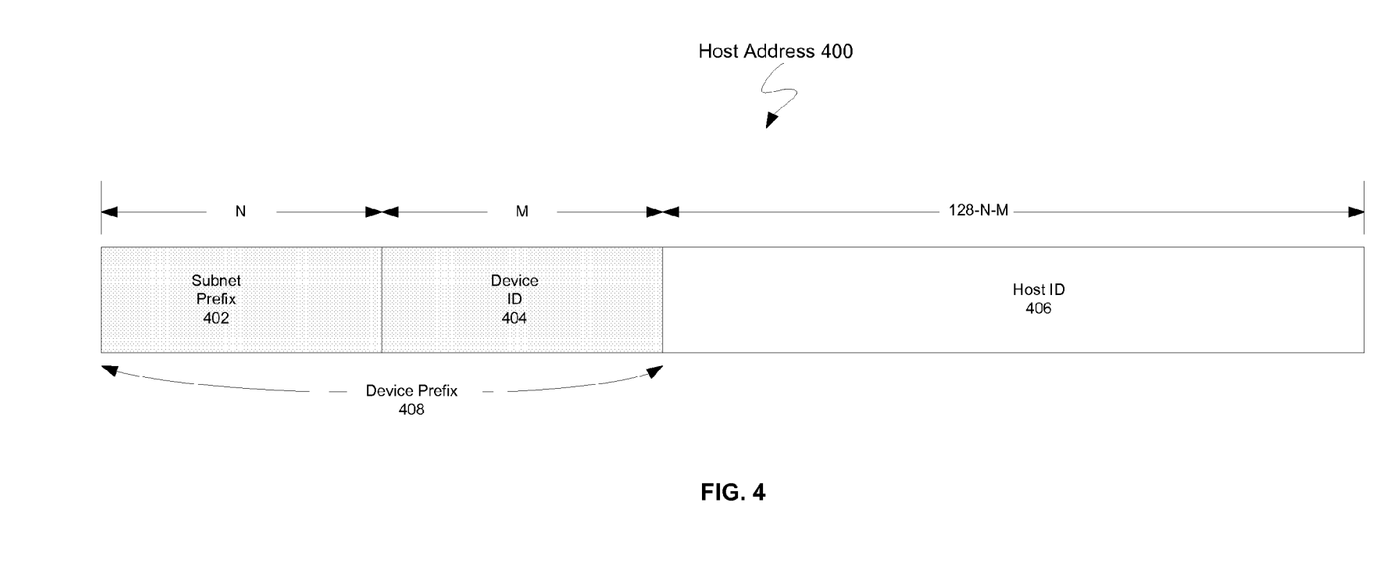
FIG. 4 illustrates an IPv6 host address according to some implementations.

FIG. 4 shows an IPv6 host address 400 according to some implementations. Host address 400 occupies 128 bits, or 16 bytes. Host address 400 includes a subnet prefix 402, a device ID 404, and a host ID 406.

Subnet prefix 402 occupies N bits. The N bits can be the highest order bits. The exact location of the N-bits depends on the architecture of processor 204 of the switch. For a big-endian processor, the highest order N bits will be stored as the last N bits of the 16 bytes. For a little endian processor, the highest order N bits will be stored as the first N-bits of the 16 bytes. In some implementations, each VLAN is assigned a unique subnet prefix 402.

Device ID 404 is the next M bits following subnet prefix 402. As discussed above, the exact storage location of device ID 404 depends on the architecture of processor 204 of the switch. Device ID uniquely identifies a switch on the managed network in the data center.

In some implementations, the combined bits of subnet prefix 402 and device ID 404 form device prefix 408. By including a device ID—which uniquely identifies a switch in the data center—and a subnet prefix—uniquely identifying a VLAN, the device prefix may be used to uniquely identify a given VLAN in association with a particular switch. Because a given VLAN can span over more than one switch, the provision of device prefix 404 may allow a way to address a given VLAN along with each of the switches spanned over by the given VLAN. Some implementations may enumerate a number of device prefixes covering the switches spanned over by the given VLAN.

Host ID 406 may take up the remaining bits, as shown in FIG. 4. Host ID 406 uniquely identifies a given VM hosted on a physical server computer in the data center. As discussed above, each physical server computer may host other VMs as well.

A FIB CAM table on a switch 200 includes, for example, 16 thousands IPv6 entries. A IPV6 entry may include a device prefix—a concatenation of subnet prefix 402 and device ID 404, as discussed above. An IPv6 entry may further include forwarding information of the next hop switch for transporting a packet to the particular switch in the data center. The forwarding information may include, for example, MAC address of the next-hop switch, and the port number on switch 200, the port on switch 200 being connected to a port on the next-hop switch.

Some implementations may use the device prefix to coalesce the address information of VMs on the same switch into one IPv6 entry. The device ID of the device prefix uniquely identifies the switch that connects to the coalesced VMs without intervening switches. Using the device prefix, a system can scale up and support up to millions VMs.

The following equation may be used to calculate the maximum number of VMs supported by some implementations:

$$H = (F - V \times S) \times S \qquad (1)$$

wherein H is the maximum of VMs in the data center, F is the FIB CAM table size, V is the number of VLANs per switch, and S is the number of switches in the data center. The FIB CAM table on a switch is for both device prefix entries and entries for the VMs on the switch. The maximum number of device Prefixes would be the number of switches (S) in the data center times the average number of VLANs per Switch (V). After the device prefix entries are stored in the FIB CAM table, the space left in the table can be used by entries for local hosts. Thus, the remaining space can be determined as (F−(V×S)). This remaining space may determine the maximum number of local VMs supported by each switch. In particular, the total number of VMs supported by the entire virtual switching system may be the maximum number of VMs at each switch (F−(V×S)) multiplies the number of switches (S). Hence, H=(F−(V×S))×S. For example, with a FIB CAM table size of 16 thousand entries, 100 switches, and 50 VLANs per switch, a total of 1.1 millions VMs can be supported at the data center. In this illustrative example, 50 VLANs per switch means 50 VLANs are configured on a switch. This configuration could mean the switch supports 50 VLANs and each of the 50 VLANs can span across the switch and other switches at the data center. Thus, according to some implementations, switches can employ device prefix provisions so that a limited-size table can support the routing needs of a large numbers of VMs at the data center. Therefore, the challenge in the data plane brought by large numbers of VMs can be addressed by the device prefix provision in some implementations.

Some implementations include load balancing to even out the number of VMs on each switch. Implementations of load balancing also may include policies to reduce the chances that some switches become over-subscribed by VMs or over-loaded by packet traffic of the subscribed VMs.

Figure 5:
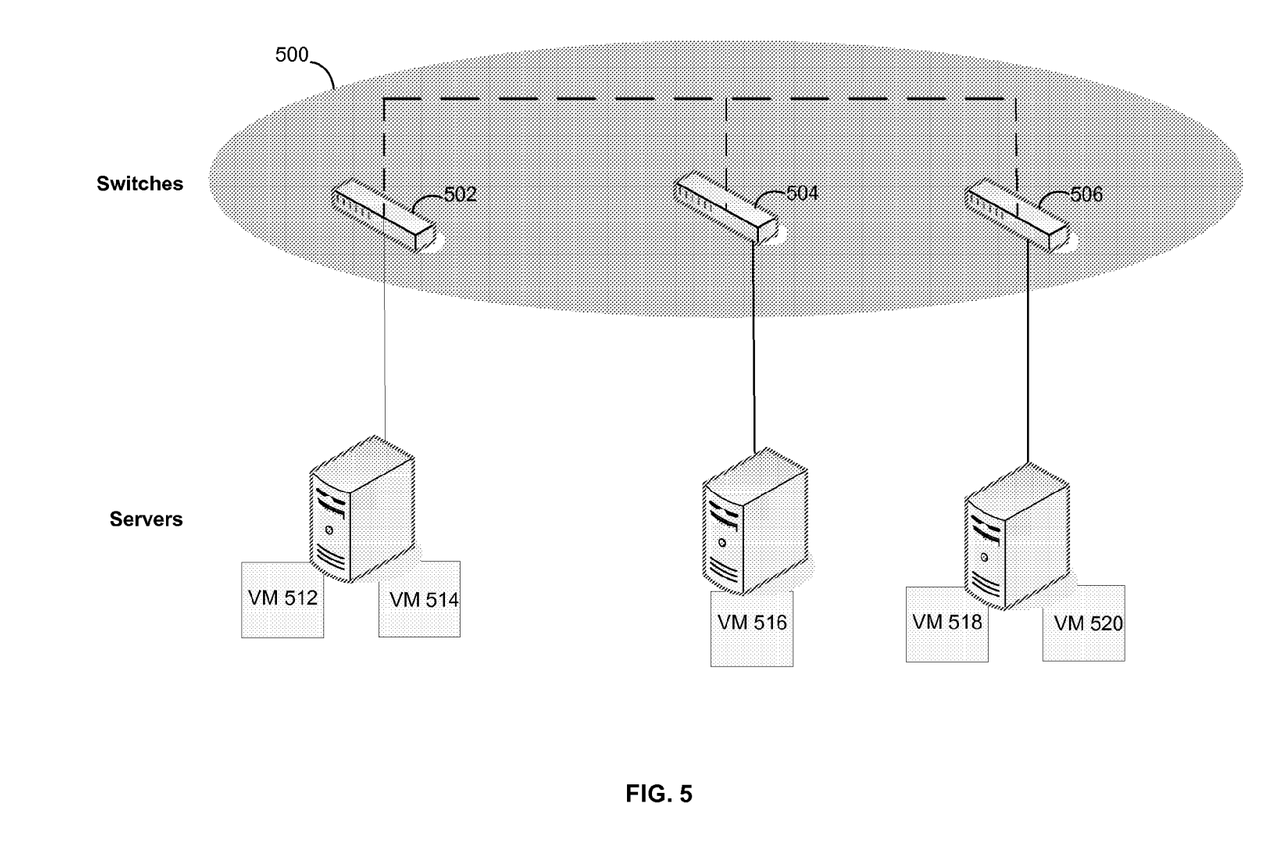
FIG. 5 illustrates a data center configured to host large numbers of virtual machine according to some implementations.

FIG. 5 illustrates a data center configured to host large numbers of virtual machine according to some implementations. The data center is supported by a multi-device switching system (MDSS) 500. As shown in FIG. 5, MDSS 500 includes switches 502, 504, and 506 dedicated to moving packets around the managed network. In some implementations, switches 502, 504, and 506 include Top-of-the-Rack (ToR) switches. The term "top-of-rack" is used in a broad sense. Switches do not need to literally be placed at the top of the rack but can appear anywhere in the field of servers. Also, ToR switches do not necessarily need to connect only to servers in the rack in which the ToR switches reside. For example, a 40-port switch capable of consolidated I/O can easily address 32 four-rack-unit (4RU) servers distributed over four racks adjacent to the rack housing the 40-port switch. The limit of connectivity to neighboring racks may depend on the number of ports per switch and the 10 m maximum length of Twinax cable. Connection over multiple racks is sometimes referred to as multi-rack connection, and the multiple racks may be referred to as a rack module. Switches 502, 504, and 506 communicate with each other in a multi-tiered architecture. The multi-tiered architecture includes a first tier, a second tier on top of the first tier, and a third tier on top of the second tier. As discussed above, core switches perform switching functions in the third tier. In the second tier, aggregation switches perform the switch functions. In the first tier, access switches perform switching for end-user computing devices.

FIG. 5 shows VMs 512 and 514 on switch 502. Packets transmitted by VMs 512 and 514 are forwarded by switch 502 to the managed network of the data center. Packets destined to VMs 512 and 514 are last forwarded by switch 502 to VMs 512 and 514, respectively. There are no intervening switches between switch 502 and VMs 512 and 514. Thus, VMs 512 and 514 are on switch 102. VMs 512 and 514 jointly reside on one physical server computer, as illustrated in FIG. 5.

FIG. 5 also shows VM 516 on switch 504. There are no intervening switches between switch 504 and VM 516. Packet exchanges between VM 516 and switch 504 are similar to packet exchanges between VMs 512/514 and switch 502.

FIG. 5 further shows VMs 518 and 520 on switch 506. There are no intervening switches between switch 506 and VMs 518/520. Packet exchanges between VMs 518/520 and switch 104 are similar to packet exchanges between VMs 512/514 and switch 502. VMs 518 and 520 jointly reside on one physical server computer, as illustrated in FIG. 5.

By way of an example, packets transmitted by VM 512 and destined for VM 518 may arrive at switch 502. Switch 502 may inspect the packets for the destination address. Then switch 502 may consult a hardware memory 206 on switch 502 to ascertain where to forward to packet. The hardware memory 206 may include prefix information identifying switches at the data center and hardware address information (such as, for example, MAC address, port number) of the next-hop switches to forward packets to the respective switches in the data center. Switch 502 may look up the address information of the next hop switch for forwarding the incoming packet to switch 506 by searching the prefix information that matches the device prefix identifying switch 506. In this illustrative example, the next-hop switch is switch 506 itself and the search will yield the hardware address of switch 506. Switch 502 may then forward packets transmitted by VM 512 and destined for VM 518 to switch 506. In a three-tier architecture, the path may be through additional intervening switches, for example, aggregation switches at tier 2 and core switches at tier 1, as discussed above. Switch 506 may inspect the packets for destination address and then direct the packets to VM 518.

Likewise, packets transmitted by VM 518 and destined for VM 512 may arrive at switch 506. Switch 506 may inspect the packets for the destination address. Then switch 506 may consult a hardware memory 206 on switch 506 to ascertain where to forward the packet. The hardware memory 206 may include prefix information identifying switches at the data center and hardware address information (such as, for example, MAC address, port number) of the next-hop switches to forward packets to the respective switches in the data center. Switch 506 may look up the address information of the next hop switch for forwarding the incoming packet to switch 502 by searching the prefix information that matches the device prefix identifying switch 502. In this illustrative example, the next-hop switch is switch 502 itself and the search will yield the hardware address of switch 502. Switch 506 may then forward packets transmitted by VM 518 and destined for VM 512 to switch 502. In a three-tier architecture, the path may be through additional intervening switches, for example, aggregation switches at tier 2 and core switches at tier 1, as discussed above. Switch 502 may inspect the packets for destination address and then direct the packets to VM 512.

The data center provides a multitude virtual area networks (VLANs). Each VLAN includes at least one Virtual Machine (VM). The VLAN is capable of spanning across more than one of the multitude of switches. For example, a given VLAN can include VMs 512 and 518 on switches 502 and 506, respectively.

Switches 502, 504, and 506 may be configured to transfer packets between the second tier and the third tier of the multi-tier architecture. In some implementations, switches 502, 504, and 506 may use a routing table to assist transferring packets between the VMs.

As discussed above in association with FIG. 4, the routing table includes Internet Protocol version 6 (IPv6) entries.

Some implementations provision device prefixes for the IPv6 entries in the routing table. Specifically, the device prefix corresponds to a quantity of bits in an IPv6 entry. As discussed above in association with FIG. 4, a given device prefix includes a subnet prefix and a device ID. The subnet prefix may uniquely identify a VLAN. The device ID may uniquely identify the particular switch.

In some implementations, a given IPv6 entry further includes a host ID corresponding a particular virtual machine (VM). The host ID and the given device prefix are both included in the host address of the particular VM. The particular VM is on the particular switch, as discussed above. In other words, the particular virtual machine resides on a physical computer server that is connected to the particular switch without additional intervening switches.

Switches 502, 504, and 506 are further configured to propagate, to each other, information encoding the device prefixes provisioned in their respective routing tables. In one configuration, the propagation is according to an Interior Gateway Protocol (IGP) and through at least one of the distribution switches in the second layer and at least one core switch in the first layer. The IGP protocol can include, for example, Routing Information Protocol next generation (RIPng), Open Shortest Path First version 3 (OSPFv3), and Intermediate System-to-Intermediate System (ISIS) for IPv6.

In some implementations, the routing information in routing table used by, for example, switch 502, is converted to FIB information and stored in a Forwarding Information Base (FIB) Content Addressable Memory (CAM) of switch 502. The FIB CAM is a hardware memory providing fast-access to contents stored therein. The FIB CAM may be limited in size. In some implementations, the FIB CAM includes 16 thousand IPv6 entries. Each entry may include a prefix field and a corresponding next-hop address field. The prefix may correspond to the device prefix 404 and may identify a particular switch that supports the destination address. The next-hop address field may provide the forwarding information of the particular switch. For example, the forwarding information may include the MAC address of the particular switch. The forwarding information may also include the information identifying a port on switch 502 that is, for example, connected to a port on the particular switch via a cable. The FIB CAM may be based on merchant computing hardware. In other words, the FIB CAM may not be a custom-made device based on specially designed hardware of extended memory size that is uncommon in standard merchant products.

Switches 502, 504, and 506 are further configured such that if a VM, for example, VM 512, is reassigned from a switch 502 to switch 506 on the same VLAN, switch 502 will relearn a MAC address of VM 512 through a port associated with switch 506 and subsequently forward packets destined for VM 512 received thereafter to switch 506, where VM 512 has been reassigned. The VM 512, after reassignment, will acquire a new host address that includes a device prefix corresponding to switch 506 and the VLAN thereon. In some implementations, after the reassignment, VM 512 sends Neighbor Discovery Neighbor Advertisement packets to all switches and VMs on the VLAN in the data center using a multicast mode. In some implementations, if VM 512 is still on the same VLAN after the move, VM 512 sends Neighbor Discovery Neighbor Advertisement packets to all switches serving the VLAN. Switch 502 can relearn the MAC address of VM 512 through a port (on switch 502) associated with switch 506 from the Neighbor Discovery Neighbor Advertisement packets. The port is associated with switch 506 means that the port is connected to switch 506 via a cable and the packets transported to switch 506 go through the port. MAC address of VM 512 may be the MAC address of the host computer for VM 512. In some implementations, once Switch 502 relearns the MAC address of VM 512 through a port (on switch 502) associated with switch 506, switch 502 employs tier 2 bridging to forward subsequent packets destined to VM 512 to switch 506. Tier 2 bridging involves aggregation switches at tier 2 of the above described multi-tier network architecture.

Thus, a host address may be assigned to the relocated VM 512. The new address includes the Device Prefix of the alternate switch 506, to which VM 512 has relocated. New communication to VM 512 from other VMs (e.g. VM 516) that are connected to other switches will use the new host address and traffic from other VMs are forwarded directly to the new switch 506 without go through the switch 502. Therefore, the forwarding is substantially optimized after VM move in the sense that such forward does not incur additional intermediate hops through a third switch.

In some implementations, after the reassignment of VM 512, switch 502 will continue the forwarding operation for the connections of VM 512 that have been in existence prior to the reassignment in which the old IPv6 address were being used. When these pre-existing connections are terminated, switch 502 will stop forwarding and the IPv6 entry corresponding to VM 512's old address (i.e., on switch 502) will be removed from routing tables of other switches in the data center.

In other implementations, the switches in the data center process Neighbor Discovery Neighbor Advertisement packets in a distributed manner. As discussed above, the amount of Neighbor Discovery Neighbor Advertisement packets generated by the large number of VMs in the data center can be overwhelming. The distributed processing approach in some implementations can address the control plane issue brought by the large number of VMs at the data center. For example, each switch may run a Neighbor Discover process that does not engage in coordination with Neighbor Discover processes on other switches. In this manner, an individual switch tends to process the Neighbor Discovery Neighbor Advertisement packets generated by particular VMs directly connected to the switch (without intervening switches) and thus other switches may not see such Neighbor Discovery Neighbor Advertisement packets generated by these particular VMs. As a result, the potentially inundating aggregate amount of data traffic in the control plane can be mitigated.

IPv6 ND packets may include IPv6 ICMP packets that can have five reserved ICMP message types, namely, Router Solicitation (133), Router Advertisement (134), Neighbor Solicitation (135), Neighbor Advertisement (136) and Redirect (137). Corresponding to these five types of IPv6 ICMP packets, a set of access-lists (ACLs) can be programmed on the switch with local processor as its destination. These ACLs list the ICMP packets types that should be processed by the processor of the switch. As a result, ICMP packets permitted under the ACL would be punt to the local processor of the switch (e.g., processor 204 of switch 200 in FIG. 2). Hence, ND-NA packets will not reach aggregation switches in the second tier of the three-tier network architecture. In this manner, the chances that distribution switch are inundated with ND-NA packets are substantially reduced.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document describe many specifics, these should not be construed as limitations on the scope of an invention that is claimed or of what is claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features is described above as acting in certain combinations and even initially claimed as such, one or more features from a claimed combination can in some cases be excised from the combination, and the claimed combination is directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for managing switches in a data center, the method comprising:

establishing, at a switch in the data center, a connection with at least one other switch in the data center which has a multi-tiered architecture, the multi-tiered architecture having at least a first tier, a second tier on top of first tier and a third tier on top of the second tier;

configuring a hardware memory of the switch to include a table having a plurality of Internet Protocol version 6 (IPv6) entries, each IPv6 entry including prefix information identifying a specific Virtual Local Area Network (VLAN) on a specific switch in the data center and forwarding information associated with the specific switch in the data center;

provisioning, at the switch, device prefixes for IPv6 addresses;

transferring, by the switch, packets using the prefix information and address information in the hardware memory;

propagating, by the switch over the established connection, information encoding the device prefixes provisioned on the switch to at least one other switch in the data center, the information being propagated through the second tier or the third layer of the multi-tiered architecture;

in response to a VM being reassigned from the switch to an alternate switch on the particular VLAN within the data center, relearning, by the switch, a media access control (MAC) address of the VM through a port on the switch, the port associated with the alternate switch wherein the VM, after reassignment, is associated with a new host address that includes a device prefix corresponding to the alternate switch and a VLAN thereon; and subsequently forwarding packets destined to the VM through the alternate switch.

2. The method of claim 1, wherein each device prefix of the device prefixes corresponds to a quantity of bits in an IPv6 address, wherein the device prefixes include a subnet prefix and a device identifier, wherein the subnet prefix identifies a particular VLAN, wherein the device identifier identifies a particular switch, wherein the particular VLAN spans across a plurality of switches including the particular switch, and wherein each IPv6 address of the IPv6 addresses further include a host identifier that identifies a particular virtual machine (VM) on the particular VLAN.

3. The method of claim 1, wherein the information is propagated through the second tier and then through the third tier.

4. The method of claim 1, wherein the hardware memory comprises a Forwarding Information Base (FIB) Content Addressable Memory (CAM).

5. The method of claim 1, further comprising: transmitting, by the switch, IPv6 Neighbor Discovery (ND) packets.

6. The method of claim 1, wherein the switch and the at least one other switch are Top-of-the-Rack (ToR) switches.

7. The method of claim 1, wherein the information is propagated according to an Interior Gateway Protocol (IGP).

8. An apparatus comprising:
at least one network interface to communicate with a computer network;
a processor coupled to the at least one network interface and configured to execute one or more processes; and
a memory configured to store a process executable by the processor, the process when executed operable to:
establish a connection with at least one switch in a data center which has a multi-tiered architecture, the multi-tiered architecture having at least a first tier, a second tier on top of first tier and a third tier on top of the second tier;
configure the memory to include a table having a plurality of Internet Protocol version 6 (IPv6) entries, each IPv6 entry including prefix information identifying a specific virtual local area network (VLAN) on a specific switch in the data center and forwarding information associated with the specific switch in the data center;
provision device prefixes for IPv6 addresses;
transfer packets using the prefix information and address information;
propagate information encoding the device prefixes provisioned to at least one switch in the data center, the information being propagated through the second tier or the third layer of the multi-tiered architecture;
in response to a VM being reassigned from the switch to an alternate switch on the particular VLAN within the data center, relearning, by the switch, a media access control (MAC) address of the VM through a port on the switch, the port associated with the alternate switch wherein the VM, after reassignment, is associated with a new host address that includes a device prefix corresponding to the alternate switch and a VLAN thereon; and
subsequently forwarding packets destined to the VM through the alternate switch.

9. The computer system of claim 8, wherein the hardware memory comprises a Forwarding Information Base (FIB) Content Addressable Memory (CAM).

10. The apparatus of claim 8, wherein the information is propagated according to an Interior Gateway Protocol (IGP).

11. The computer system of claim 8, wherein each device prefix of the device prefixes corresponds to a quantity of bits in an IPv6 address, wherein the device prefixes include a subnet prefix and a device identifier,
wherein the subnet prefix identifies a particular VLAN,
wherein the device identifier identifies a particular switch,
wherein the particular VLAN spans across a plurality of switches including the particular switch, and
wherein each IPv6 address of the IPv6 addresses further include a host identifier that identifies a particular virtual machine (VM) on the particular VLAN.

12. A tangible, non-transitory, computer-readable media having software encoded thereon, the software when executed by a processor operable to:
establish a connection with at least one switch in a data center which has a multi-tiered architecture, the multi-tiered architecture having at least a first tier, a second tier on top of first tier and a third tier on top of the second tier;
configure the memory to include a table having a plurality of Internet Protocol version 6 (IPv6) entries, each IPv6 entry including prefix information identifying a specific virtual local area network (VLAN) on a specific switch in the data center and forwarding information associated with the specific switch in the data center;
provision device prefixes for IPv6 addresses;
transfer packets using the prefix information and address information;
propagate information encoding the device prefixes provisioned to at least one switch in the data center, the information being propagated through the second tier or the third layer of the multi-tiered architecture;
in response to a VM being reassigned from the switch to an alternate switch on the particular VLAN within the data center, relearning, by the switch, a media access control (MAC) address of the VM through a port on the switch, the port associated with the alternate switch wherein the VM, after reassignment, is associated with a new host address that includes a device prefix corresponding to the alternate switch and a VLAN thereon; and
subsequently forwarding packets destined to the VM through the alternate switch.

13. The tangible, non-transitory, computer-readable media of claim 12, wherein each device prefix of the device prefixes corresponds to a quantity of bits in an IPv6 address,
wherein the device prefixes include a subnet prefix and a device identifier,
wherein the subnet prefix identifies a particular VLAN,
wherein the device identifier identifies a particular switch,
wherein the particular VLAN spans across a plurality of switches including the particular switch, and
wherein each IPv6 address of the IPv6 addresses further include a host identifier that identifies a particular virtual machine (VM) on the particular VLAN.

14. The tangible, non-transitory, computer-readable media of claim 12, wherein the memory is a Forwarding Information Base (FIB) Content Addressable Memory (CAM).

* * * * *